United States Patent
Chang et al.

(10) Patent No.: US 10,647,224 B2
(45) Date of Patent: May 12, 2020

(54) FLUTTERING PREVENTION APPARATUS FOR LEVER OF PUMPING DEVICE

(71) Applicant: HYUNDAI DYMOS INCORPORATED, Seosan-si, Chungcheongnam-do (KR)

(72) Inventors: Seung Hun Chang, Hwaseong-si (KR); Young Sun Lee, Seoul (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 16/203,835

(22) Filed: Nov. 29, 2018

(65) Prior Publication Data

US 2019/0193597 A1 Jun. 27, 2019

(30) Foreign Application Priority Data

Dec. 26, 2017 (KR) .................. 10-2017-0180226

(51) Int. Cl.
*B60N 2/16* (2006.01)
*F16D 41/066* (2006.01)
*F16D 41/10* (2006.01)
*F16D 67/02* (2006.01)

(52) U.S. Cl.
CPC .............. *B60N 2/167* (2013.01); *B60N 2/168* (2013.01); *F16D 41/066* (2013.01); *F16D 41/105* (2013.01); *F16D 67/02* (2013.01); *F16D 2041/0665* (2013.01)

(58) Field of Classification Search
CPC ...... B60N 2/1635; B60N 2/167; B60N 2/168; F16D 41/00–22; F16D 43/00; F16D 43/02; F16D 43/20–208; F16D 45/00
See application file for complete search history.

(56) References Cited

U.S. PATENT DOCUMENTS 10,118,507 B2 * 11/2018 Chae .................... B60N 2/1635

FOREIGN PATENT DOCUMENTS

| KR | 10-0722849 B1 | 5/2007 |
| KR | 10-0784620 B1 | 12/2007 |
| KR | 10-2013-0024640 A | 3/2013 |
| KR | 10-1774341 B1 | 9/2017 |

OTHER PUBLICATIONS

Korean Office Action dated Jan. 30, 2019 from the corresponding Korean Application No. 10-2017-0180226, 5 pp.

* cited by examiner

*Primary Examiner* — Jacob S. Scott
(74) *Attorney, Agent, or Firm* — Brinks Gilson & Lione

(57) ABSTRACT

A fluttering prevention apparatus for a lever of a pumping device includes: a lever bracket including a first side coupled with a lever, a center portion formed with a hollow hole, and a second side formed with insertion holes; a clutch cam including a first side provided with protruding portions inserted into the insertion holes of the lever bracket; a clutch drum having a first side formed with a seat groove to receive the clutch cam is seated therein; and a spindle coupled to the hollow hole of the lever bracket through center portions of the clutch drum, the clutch cam, and the housing, thereby inhibiting the lever bracket from fluttering with respect to the clutch drum.

7 Claims, 4 Drawing Sheets

FIG. 1 "PRIOR ART"

FLUTTERING PREVENTION APPARATUS FOR LEVER OF PUMPING DEVICE

CROSS REFERENCE TO RELATED APPLICATION

The present application claims priority to and the benefit of Korean Patent Application No. 10-2017-0180226, filed on Dec. 26, 2017, the entire contents of which are incorporated herein by reference.

FIELD

The present disclosure relates to a fluttering prevention apparatus for a pumping device.

BACKGROUND

The statements in this section merely provide background information related to the present disclosure and may not constitute prior art.

A conventional pumping device is attached to a seat such that a seat occupant manually adjusts the height of the seat cushion to match the seat occupant's body shape.

If the seat occupant operates a lever handle installed on the side of the seat cushion clockwise or counterclockwise, the operating force of the lever handle is transmitted to the link mechanism through the seat pumping device to raise or lower the seat cushion in accordance with the operating direction of the lever handle so that the height of the seat cushion can be adjusted.

FIG. 1 is a component diagram showing a conventional seat pumping device. Referring to FIG. 1, a seat pumping device for a vehicle includes: a lever bracket 100 configured to be integrally rotated with a lever handle (not shown) that is operated by a user; a return spring guide 110 in which a return spring 112 providing a restoring force to the lever bracket 100 is accommodated; a housing 120 formed in a drum 122 shape and provided inside a seat cushion (not shown); a clutch mechanism 130 accommodated in the housing 120 and configured to receive a user's rotational operating force through the lever bracket 100 and transmit the same; a brake mechanism 140 configured to cut off torque reversely input and maintain the adjusted height of the seat cushion; and a housing cover 150 coupled to a side of the housing 120 to cover the housing 120.

The return spring guide 110 may be provided with a donut-shaped groove on a side surface to receive the return spring 112.

The clutch mechanism 130 includes: a clutch cam 134 accommodated in a clutch drum 132; a plurality of clutch rollers 136 provided between an outer circumferential surface of the clutch cam 134 and an inner circumferential surface of the clutch drum 132; and a clutch spring 138 configured to elastically support the clutch rollers 136.

On a side surface of the clutch cam 134, a plurality of coupling protrusions 135 are provided spaced apart from each other at a predetermined interval in a circumferential direction. In the middle of a bottom surface 124 of the drum 122 of the housing 120, a through-hole 126 is formed such that the coupling protrusions 135 of the clutch cam 134 are inserted thereinto. The lever bracket 100 includes a coupling drum 104 protruding in an axial direction.

The coupling protrusions 135 of the clutch cam 134 protrude through the through-hole 126 of the housing 120 and are inserted into assembly-holes famed in the bottom surface of the coupling drum 104 of the lever bracket 100 and welded to be integrally coupled with the lever bracket 100.

The lever arm 102, which is provided in the lever bracket 100 and is bent in the axial direction, is elastically supported by the return spring 112 of the return spring guide 110 in the circumferential direction, such that when the lever bracket 100 is rotated in response to the lever handle operation by the user, the return spring 112 is compressed by the lever arm 102 of the lever bracket 100 and provides an elastic restoring force to the lever bracket 100.

We have discovered that since the conventional clutch cam 134 is coupled to the lever bracket 100 via the coupling protrusions 135, and is rotated with respect to the clutch drum 132, when the seat occupant operates the lever handle, the lever bracket 100 and the clutch cam 134 flutter. This lowers the operability of the lever.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure proposes a fluttering prevention apparatus for a lever of a pumping device, in which during operating the lever of the pumping device by a seat occupant, the lever is inhibited or prevented from fluttering from side to side, whereby the operability of the lever is improved, it is possible to reduce occurrence of operation noise, and ultimately, it is possible to improve the pumping device's marketability.

In one form of the present disclosure, a fluttering prevention apparatus for a lever of a pumping device may include: a lever bracket including a first side coupled with a lever, a center portion formed with a hollow hole, and a second side formed with a plurality of insertion holes around the hollow hole of the lever bracket; a clutch cam including a first side provided with protruding portions protruding toward the lever bracket, wherein the protruding portions are inserted into the insertion holes of the lever bracket through a housing; a clutch drum provided with a seat groove formed in a first side thereof such that the clutch cam is seated therein, and configured to rotate by receiving power from the clutch cam; and a spindle coupled to the hollow hole of the lever bracket through center portions of the clutch drum, the clutch cam, and the housing, and configured to inhibit the lever bracket from fluttering with respect to the clutch drum.

The spindle may include: a first side provided with a cylindrical penetrating portion configured to penetrate through a hollow hole formed at the center portion of the clutch cam, a hollow hole formed at the center portion of the housing, and the hollow hole of the lever bracket; and a second side provided with a stopper portion having a diameter larger than a diameter of the cylindrical penetrating portion so as to be in close contact with a second side of the clutch cam.

The cylindrical penetrating portion of the spindle may be pressingly inserted into the hollow hole of the clutch cam and the hollow hole of the lever bracket, and the diameter of the stopper portion of the spindle may be equal to a diameter of the hollow hole formed at the center portion of the clutch drum.

When torque configured to rotate the spindle more than a set angle with respect to a central axis of the spindle is applied, an outer circumferential surface of the stopper portion is brought into contact with an inner circumferential surface of the hollow hole of the clutch drum to stop rotation of the lever bracket.

The lever bracket may be provided with a receiving groove on the first side thereof, and the penetrating portion of the spindle may have a length longer than or equal to a length from the second side of the clutch cam to a bottom surface of the receiving groove.

The protruding portions of the clutch cam may be formed by half-piercing.

The protruding portions of the clutch cam may be inserted into the insertion hole of the lever bracket and welded.

According to the fluttering prevention apparatus for a lever of a pumping device configured as described above, it is advantageous in that during operating the lever of the pumping device by a seat occupant, the lever is inhibited or prevented from fluttering from side to side, whereby the operability of the lever is improved, it is possible to reduce operation noise, and ultimately, it is possible to improve the pumping device's marketability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
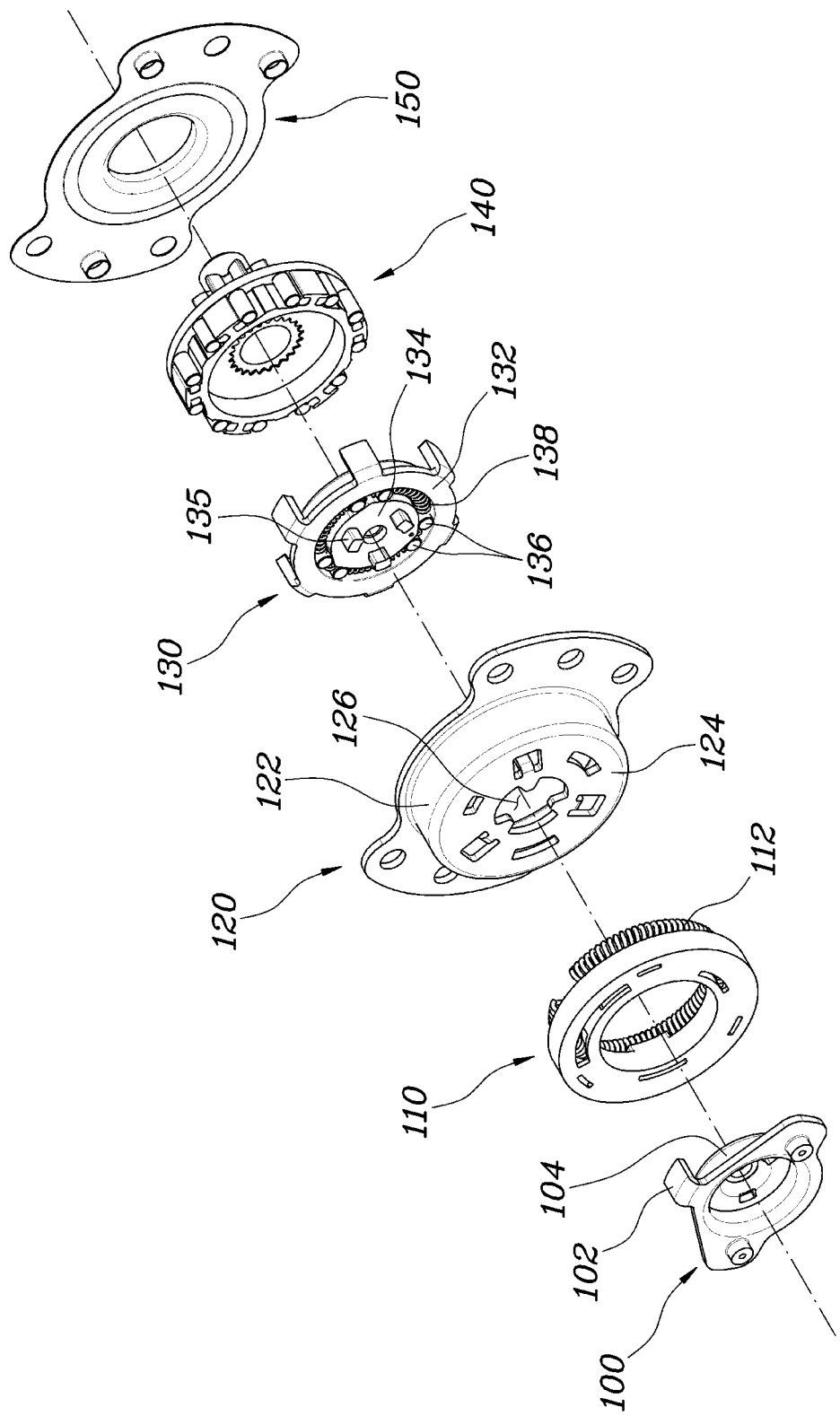
FIG. 1 is a component diagram showing a conventional seat pumping device.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, fluttering prevention apparatus for a lever of a pumping device according to an exemplary form of the present disclosure will be described in detail with reference to the accompanying drawings.

Figure 2:
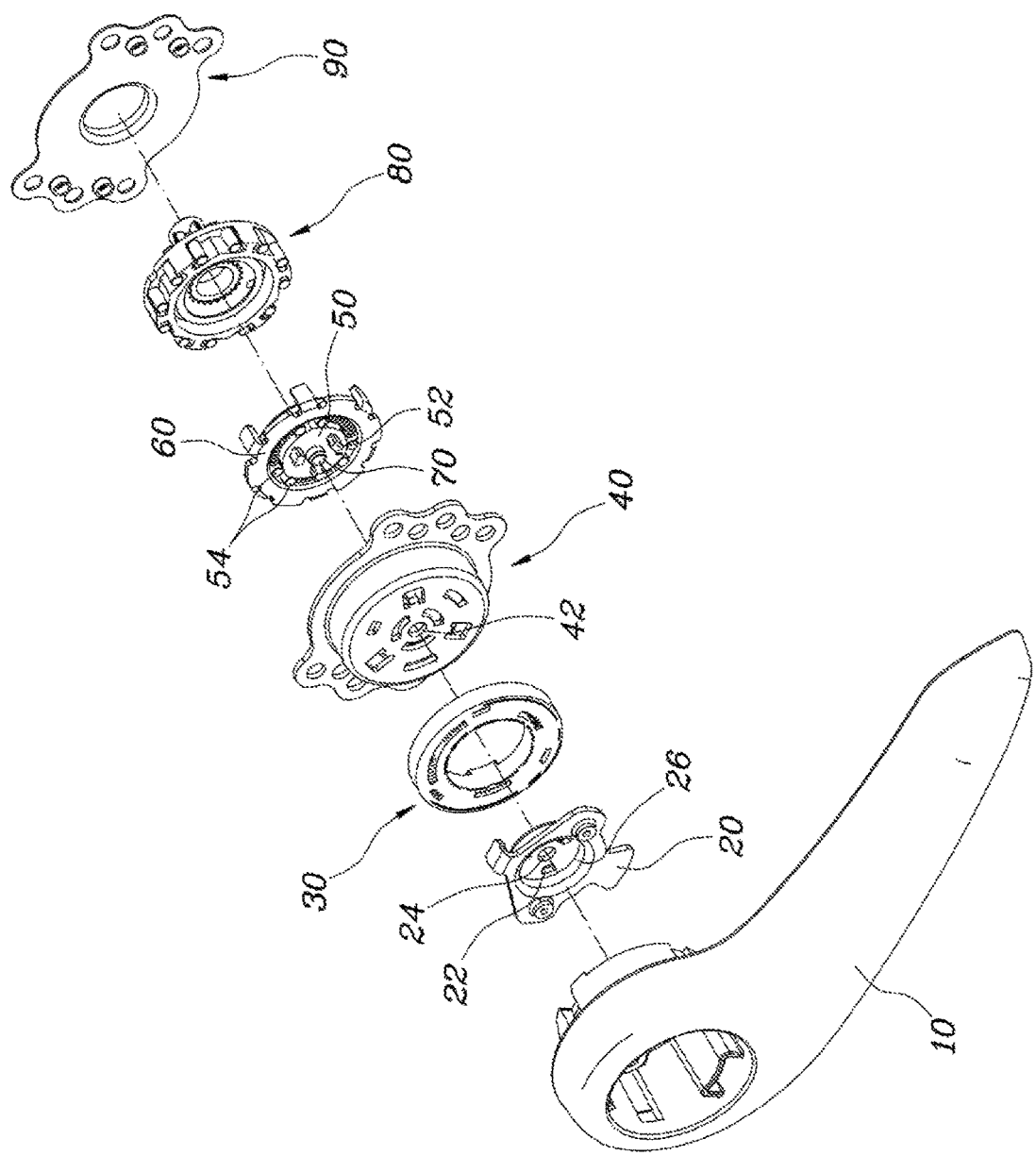
FIG. 2 is an exploded perspective view showing a fluttering prevention apparatus for a lever of a pumping device according to an exemplary form of the present disclosure.
Figure 3:
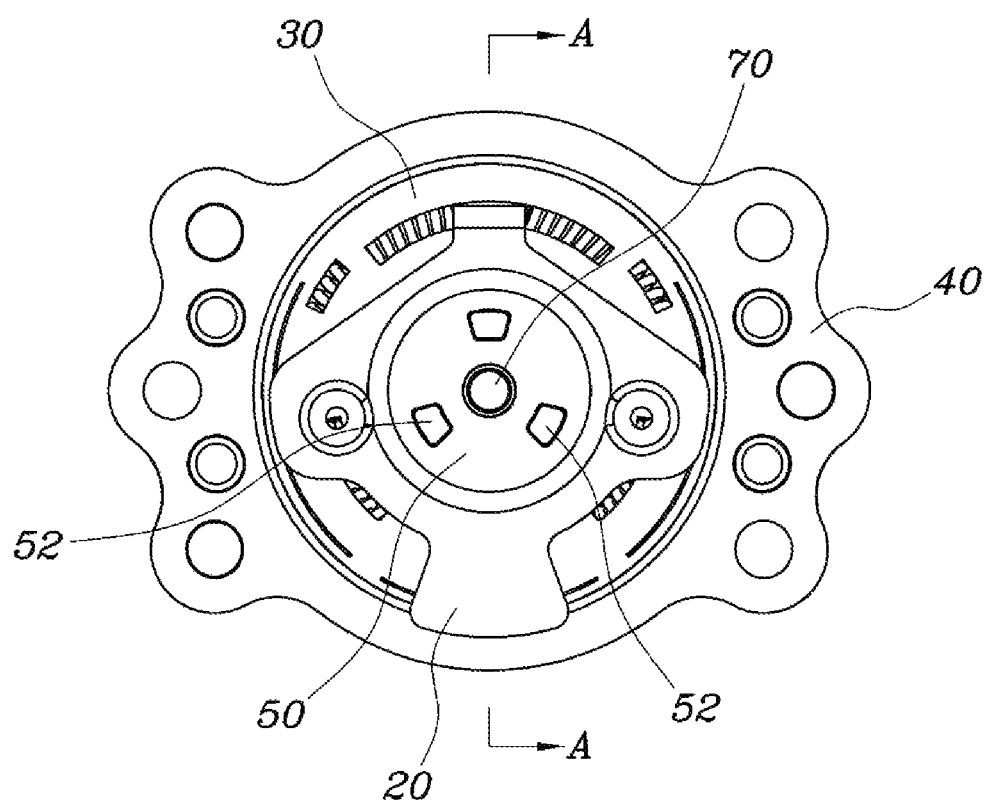
FIG. 3 is a front view showing a state where a lever bracket, a housing, a clutch cam, and a clutch drum are assembled together in one form of the present disclosure.

FIG. 2 is an exploded perspective view showing a fluttering prevention apparatus for a lever of a pumping device according to one form of the present disclosure; FIG. 3 is a front view showing a state where a lever bracket, a housing, a clutch cam, and a clutch drum are assembled together in one form of the present disclosure; and FIG. 4 is a sectional view taken along line A-A of FIG. 3.

Figure 4:
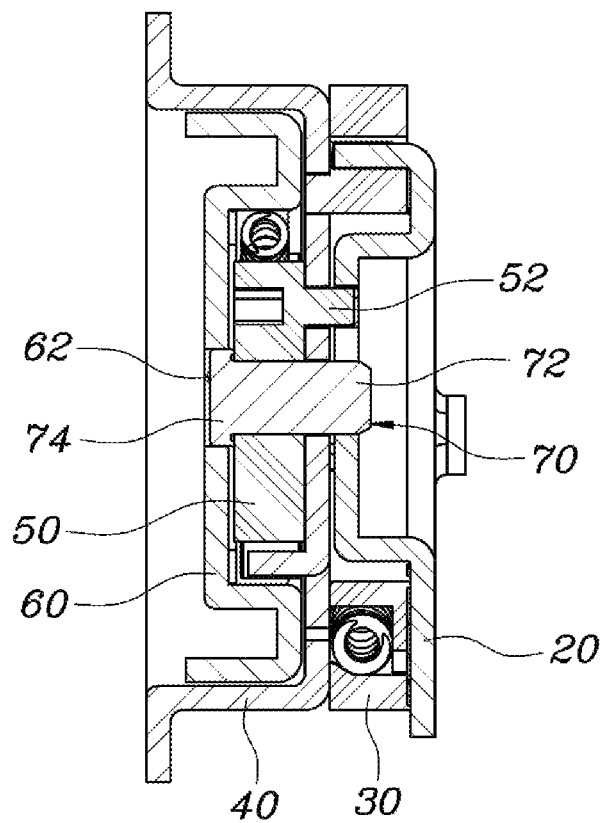
FIG. 4 is a sectional view taken along line A-A of FIG. 3.

Firstly, referring to FIGS. 2 to 4, the fluttering prevention apparatus for a lever of a pumping device includes: a lever bracket 20 configured such that a first side thereof is coupled with a lever 10, a center portion thereof is famed with a hollow hole 24, and a second side thereof is formed with a plurality of insertion holes 22 around the hollow hole 24; a clutch cam 50 configured such that a first side thereof is provided with protruding portions 52 protruding toward the lever bracket 20, and the protruding portions 52 are inserted into the insertion holes 22 of the lever bracket 20 through a housing 40; a clutch drum 60 provided with a seat groove in a first side thereof such that the clutch cam 50 is seated therein, and configured to rotate by receiving power from the clutch cam 50; and a spindle 70 coupled to the hollow hole 24 of the lever bracket 20 through center portions of the clutch drum 60, the clutch cam 50, and the housing 40, thereby inhibiting or preventing the lever bracket 20 form fluttering with respect to the clutch drum 60.

As shown in FIG. 2, the lever bracket 20 is coupled with the lever 10, and is rotated as a seat occupant manipulates the lever 10 clockwise or counterclockwise.

The clutch cam 50 rotates along with the lever bracket 20 since the protruding portions 52 is inserted into the insertion holes 22 formed in the lever bracket 20.

Herein, a return spring mechanism 30 provided between the lever bracket 20 and the housing 40 serves to provide a restoring force to the lever bracket 20, and detailed operation thereof has been variously disclosed in the prior art, and a detailed description thereof will be omitted.

The clutch cam 50 is seated in the seat groove concavely formed in the first side of the clutch drum 60, wherein clutch rollers 54 are provided between the outer circumferential surface of the clutch cam 50 and the inner circumferential surface of the seat groove of the clutch drum 60, whereby the clutch drum 60 is rotated by receiving torque of the clutch cam 50 via the clutch rollers 54. Herein, the clutch drum 60 is generally formed in a ring shape and is configured such that protrusions protrude toward the brake mechanism 80 side.

A clutch spring is alternately connected between the clutch rollers 54, wherein as the clutch cam 50 is rotated by the rotation of the lever 10, the clutch spring is compressed, and when the operating force of the lever 10 is eliminated, the clutch cam 50 is rotated and restored to the original position thereof by the restoring force of the clutch spring.

According to the above configuration, the clutch drum 60 receives torque from the clutch cam 50, but is not directly connected to the clutch cam 50. As a result, the clutch cam 50 is not completely fixed on the clutch drum 60 and may flutter, and accordingly, the lever bracket 20 and the lever 10 may flutter.

To achieve this, in the present disclosure, the spindle 70 is provided to penetrate through center portions of the clutch drum 60, the clutch cam 50 and the housing 40, and the spindle 70 is coupled to the hollow hole 24 of the lever bracket 20.

In other words, the spindle 70 sequentially penetrates through the clutch drum 60, the clutch cam 50, the housing 40, and the lever bracket 20, thereby inhibiting or preventing the lever bracket 20 from fluttering with respect to the clutch drum 60.

In particular, the torque of the lever bracket 20 and the clutch cam 50 is inhibited or prevented from being transmitted to the clutch drum 60 via the spindle 70, so that the clutch rollers 54 can receive the pressing force smoothly from the clutch cam 50.

To achieve this, the spindle 70 is configured such that a first side thereof is provided with a cylindrical penetrating portion 72 penetrating through a hollow hole formed at the center portion of the clutch cam 50, a hollow hole 42 formed at the center portion of the housing 40, and the hollow hole 24 of the lever bracket 20, and a second side of the spindle 70 is provided with a stopper portion 74 having a diameter larger than a diameter of the penetrating portion 72 as to be in close contact with the second side of the clutch cam.

Here, the penetrating portion 72 of the spindle 70 may be pressingly inserted into the hollow hole of the clutch cam 50 and the hollow hole 24 of the lever bracket 20, and the stopper portion 74 of the spindle 70 may have the diameter equal to a diameter of the hollow hole 62 formed at the center portion of the clutch drum 60.

In other words, the penetrating portion 72 with a small diameter formed on the first side of the spindle 70 is pressingly inserted into the hollow hole of the clutch cam 50 and the hollow hole 24 of the lever bracket 20, whereby the spindle 70 is fixed to the clutch cam 50, and the clutch cam 50 and the lever bracket 20 can be integrally rotated.

Meanwhile, the stopper portion 74 with a large diameter is formed on the second side of the spindle 70 so that the depth to which the spindle 70 is pressingly inserted into the clutch cam 50 and the lever bracket 20 side can be limited. Herein, the stopper portion 74 has the diameter equal to the diameter of the hollow hole 62 of the clutch drum 60, but is not pressingly inserted into the hollow hole 62 of the clutch drum 60.

Accordingly, the torque of the spindle 70 pressingly inserted into the lever bracket 20 is directly transmitted to the clutch drum 60, whereby it is possible to inhibit or prevent the phenomenon where the clutch rollers 54 provided between the clutch cam 50 and the clutch drum 60 does not smoothly receive the pressing force.

However, since the diameter of the stopper portion 74 is equal to the diameter of the hollow hole 62 of the clutch drum 60, the spindle 70 is hingedly rotated with respect to the center portion, thereby inhibiting or preventing flutter. Accordingly, it is possible to inhibit or prevent flutter of the lever bracket 20.

Herein, since the housing 40 does not need to receive torque and can also selectively serve to inhibit or prevent flutter of the lever bracket 20, the diameter of the hollow hole 42 may be equal to or larger than the diameter of the penetrating portion 72 of the spindle 70.

The fluttering prevention apparatus for a lever of a pumping device in exemplary forms of present disclosure may be configured such that when the torque is applied to the spindle 70 to be rotated greater than a set angle relative to the central axis, the outer circumferential surface of the stopper portion 74 is brought into contact with the inner circumferential surface of the hollow hole 62 of the clutch drum 60, thereby preventing rotation.

In other words, as shown in FIG. 4, since the diameter of the stopper portion 74 is equal to the diameter of the hollow hole 62 of the clutch drum 60, when torque is applied to the spindle 70 as the seat occupant operates the lever, the outer circumferential surface of the stopper portion 74 is brought into contact with the inner circumferential surface of the hollow hole 62 of the clutch drum 60, thereby inhibiting or preventing flutter of the lever bracket 20.

Accordingly, during operating the lever 10 of the pumping device, flutter is inhibited or prevented, whereby the operability of the lever is improved, and ultimately, the pumping device's marketability is improved.

Meanwhile, the lever bracket 20 may be provided with a receiving groove 26 on the first side first side thereof, and the penetrating portion 72 of the spindle 70 may have a length longer than or equal to a length from the second side of the clutch cam 50 to a bottom surface of the receiving groove 26.

Accordingly, by designing the length of the spindle 70 sufficiently long so as to fully penetrate the hollow hole of the lever bracket 20, it is possible to block the minimum possibility of side-to-side flutter occurring in the lever bracket 20.

Meanwhile, the protruding portions 52 of the clutch cam 50 may be famed by half-piercing. In other words, when the clutch cam is half-pierced using a press, the protruding portions 52 are integrally formed, whereby the time and cost required for manufacturing and assembling a separate coupling device can be reduced.

Herein, the reason why the spindle 70 is provided separately is that it is difficult to provide a sufficient length to penetrate the lever bracket 20 by only half-piercing, and when the protruding portions are made to have a sufficient length clutch cam 50, the durability is considerably reduced.

In one form of the present disclosure, the protruding portions 52 of the clutch cam 50 may be inserted into the insertion hole 22 of the lever bracket 20 and welded. Accordingly, the occurrence of flutter between the clutch cam 50 and the lever bracket 20 can be substantially reduced or minimized.

According to the fluttering prevention apparatus for a lever of a pumping device configured as described above, when the seat occupant operates the lever, it is possible to reduce or prevent the lever from fluttering from side to side, whereby the operability of the lever is improved, it is possible to reduce occurrence of operation noise, and ultimately, it is possible to improve the pumping device's marketability.

Although an exemplary form of the present disclosure has been described for illustrative purposes, those skilled in the art will appreciate that various modifications, additions and substitutions are possible, without departing from the scope and spirit of the present disclosure.

What is claimed is:

1. A fluttering prevention apparatus for a lever of a pumping device, the fluttering prevention apparatus comprising:
   a lever bracket including a first side coupled with the lever, a center portion famed with a hollow hole, and a second side formed with a plurality of insertion holes around the hollow hole of the lever bracket;
   a clutch cam including a first side provided with protruding portions protruding toward the lever bracket, wherein the protruding portions are inserted into the insertion holes of the lever bracket through a housing;
   a clutch drum provided with a seat groove formed in a first side thereof such that the clutch cam is seated therein, and configured to rotate by receiving power from the clutch cam; and
   a spindle coupled to the hollow hole of the lever bracket through center portions of the clutch drum, the clutch cam, and the housing, and configured to inhibit the lever bracket from fluttering with respect to the clutch drum.

2. The fluttering prevention apparatus of claim 1, wherein the spindle includes:
   a first side provided with a cylindrical penetrating portion configured to penetrate through a hollow hole formed at the center portion of the clutch cam, a hollow hole formed at the center portion of the housing, and the hollow hole of the lever bracket; and a second side provided with a stopper portion having a diameter larger than a diameter of the cylindrical penetrating portion so as to be in close contact with a second side of the clutch cam.

3. The fluttering prevention apparatus of claim 2, wherein the cylindrical penetrating portion of the spindle is pressingly inserted into the hollow hole of the clutch cam and the hollow hole of the lever bracket, and the diameter of the stopper portion of the spindle is equal to a diameter of the hollow hole formed at the center portion of the clutch drum.

4. The fluttering prevention apparatus of claim 2, wherein when a torque configured to rotate the spindle more than a set angle with respect to a central axis of the spindle is applied, an outer circumferential surface of the stopper portion is brought into contact with an inner circumferential surface of the hollow hole of the clutch drum to stop rotation of the lever bracket.

5. The fluttering prevention apparatus of claim 2, wherein the lever bracket is provided with a receiving groove on the first side thereof, and the penetrating portion of the spindle has a length longer than or equal to a length from the second side of the clutch cam to a bottom surface of the receiving groove.

6. The fluttering prevention apparatus of claim 1, wherein the protruding portions of the clutch cam are formed by half-piercing.

7. The fluttering prevention apparatus of claim 1, wherein the protruding portions of the clutch cam are inserted into the insertion holes of the lever bracket and welded.

* * * * *